US008321508B2

(12) United States Patent
Lingafelt et al.

(10) Patent No.: US 8,321,508 B2
(45) Date of Patent: Nov. 27, 2012

(54) CONTROLLING COLLABORATION PARTICIPATION

(75) Inventors: Charles S. Lingafelt, Durham, NC (US); David P. Merrill, New Paltz, NY (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 11/860,778

(22) Filed: Sep. 25, 2007

(65) Prior Publication Data
US 2009/0083378 A1 Mar. 26, 2009

(51) Int. Cl.
*G06F 15/16* (2006.01)

(52) U.S. Cl. ...... 709/204; 709/205; 709/206; 455/456.1; 455/456.2; 455/456.3; 455/456.4; 455/456.5; 455/456.6

(58) Field of Classification Search .................. 709/204, 709/205, 206; 455/456.1, 456.2, 456.3, 456.4, 455/456.5, 456.6
See application file for complete search history.

(56) References Cited

U.S. PATENT DOCUMENTS

| | | | |
|---|---|---|---|
| 5,892,900 A | 4/1999 | Ginter et al. | |
| 2004/0215784 A1* | 10/2004 | Qi et al. | 709/227 |
| 2005/0113123 A1* | 5/2005 | Torvinen | 455/519 |
| 2005/0260973 A1* | 11/2005 | van de Groenendaal | 455/411 |
| 2006/0173936 A1* | 8/2006 | Castro et al. | 707/205 |
| 2007/0060122 A1* | 3/2007 | Tang et al. | 455/432.1 |

OTHER PUBLICATIONS

Yi, X. et al., "A Secure Conference Scheme for Mobile Communications", IEEE Transactions on Wireless Communications, vol. 2, No. 6, Nov. 2003, pp. 1168-1177.

Hwang, M., "Dynamic Participation in a Secure Conference Scheme for Mobile Communications", IEEE Transactions on Vehicular Technology, vol. 48, No. 5, Sep. 1999, pp. 1469-1474.

* cited by examiner

*Primary Examiner* — Liangche A Wang
*Assistant Examiner* — Cheikh Ndiaye
(74) *Attorney, Agent, or Firm* — Yee & Associates, P.C.; Arthur J. Samodovitz

(57) ABSTRACT

A system and method is provided for controlling collaboration participation. The system includes a computing infrastructure configured to monitor endpoint collaboration devices and/or users. The computing infrastructure is also configured to authorize collaboration between one or more of the endpoint collaboration devices and/or users with an initiating device if the computing infrastructure finds a match between stored attributes and information related to the one or more endpoint collaboration devices and/or users.

24 Claims, 8 Drawing Sheets

CONTROLLING COLLABORATION PARTICIPATION

FIELD OF THE INVENTION

The invention generally relates to a system and method for computer systems and, more particularly, the invention relates to a system and method for controlling collaboration participation.

BACKGROUND OF THE INVENTION

In the global economy it is important to communicate with people all over the world. This is typically referred to as collaboration. The endpoints to the collaboration may be a variety of devices such as, for example, a cellular telephone, a personal digital assistant (PDA), or a personal computer (via wireless broadband, e.g., PCMCIA cards. These devices may be connected via a wireless or wired method, or a combination thereof.

For some forms of collaboration, it is desirable to either restrict collaboration participation to those who are within a particular physical area or those who are not within a particular physical area. It may also be desirable to restrict collaboration based on identification of certain persons such as those who have a certain security clearance or on a need to know basis or some combination of the above.

By way of example, for certain sensitive collaborations, it is undesirable or in some cases illegal to include certain persons or persons in a particular physical location. Illustratively, in the discussion of information subject to government export restrictions, it may be deemed an export violation to discuss certain sensitive information with individuals in a specific country.

Current practice to restrict access to certain communications includes merely asking a person if they are within the physical area of restriction or if they have certain security clearances. However, whether the collaboration is restricted depends strictly on their trustworthiness for an accurate response. In the security industry, this type of control is known as discretionary access control (DAC) because the enforcement of the access control is at the discretion of the user.

This technique is not possible for nonhuman mobile systems, such as PDAs or personal computers (PC). So, for such nonhuman mobile systems, there is no known collaboration system to enforce restrictions on collaboration participants. However, in the security industry, there is mandatory access control (MAD), which is enforcement of the access control mandated by the system and not under control of the user. This is a more reliable access control method.

Accordingly, there exists a need in the art to overcome the deficiencies and limitations described hereinabove.

SUMMARY OF THE INVENTION

In a first aspect of the invention, a computer system comprises: a central processing unit; first program instructions to monitor endpoint collaboration devices and/or users; and second program instructions to authorize collaboration between one or more of the endpoint collaboration devices and/or users with an initiating device if the computing infrastructure finds a match between stored attributes and information related to the one or more endpoint collaboration devices and/or users. The first and second program instructions are stored in said computer system for execution by said central processing unit.

In another aspect of the invention, a computer program product for controlling collaboration participation, comprises: a computer readable media; first program instructions to store predefined attributes; second program instructions to establish and continuously monitor authorization of endpoint collaboration devices and/or users to be members of a collaboration; third program instructions to authorize at least one of the endpoint collaboration devices to become the members of the collaboration based on a comparison with the stored predefined attributes and information related to the endpoint collaboration devices and/or users; and wherein said first, second and third program instructions are stored on said computer readable media.

In another aspect of the invention, a method comprises a method of storing predefined attributes and monitoring endpoint collaboration devices and/or users to be members of a collaboration. The method further includes authorizing at least one of the endpoint collaboration devices to become the members of the collaboration based on a comparison with the stored predefined attributes and information related to the endpoint collaboration devices and/or users.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for controlling collaboration participation. More specifically, the system and method of the invention is configured to restrict (or authorize) access to electronic communications. Thus, by implementing the invention, it is now possible to ensure that certain persons and/or devices can be excluded or included in communication sessions (hereinafter referred to as collaboration, which may include countless types of communications as discussed herein), depending on circumstances prescribed by an administrator, for example. This ensures that persons and/or devices outside of the intended collaboration will not be privy to confidential and/or secure information. As such, otherwise illegal communications or electronic transfer of materials will not be divulged to unintended persons and/or devices. For example, persons and/or devices can be restricted from collaboration participation related to government export restrictions, which would otherwise be deemed an export violation.

The restriction or accessibility to a collaboration may be based on, for example, particular physical area(s), particular person(s), particular attributes of a device, or a variety of different attributes. As such and advantageously, the present invention is capable of restricting or allowing access to communications from nonhuman systems, such as a PDA, cellular telephone or personal computer (PC), whether they are stationary or mobile systems using wireless or wired protocols. In this teaching, the collection of attributes upon which to base the accessibility to a collaboration decision is known as "location". In addition to physical location attributes, "Location" can also represent other attributes of the endpoint, such as SP identity, endpoint identity, link attributes, such as capacity, type, and location. It will be recognized by those skilled in the art, that these are illustrative examples of endpoint attributes and other attributes upon which to base accessibility to a collaboration exist.

The advantages of the present invention include, amongst other advantages:

The ability to prohibit accidental or intentional use of a device/user from collaborating where it may be illegal;

Providing an automated or manual, continuous check of all participants (device/user) for continued collaboration;

Providing a method to regulate a device/user to ensure there are not any increased charges (expected or unexpected) for participating in a collaboration; and Providing a methodology to keep collaborations secure.

System Environment

Figure 1:
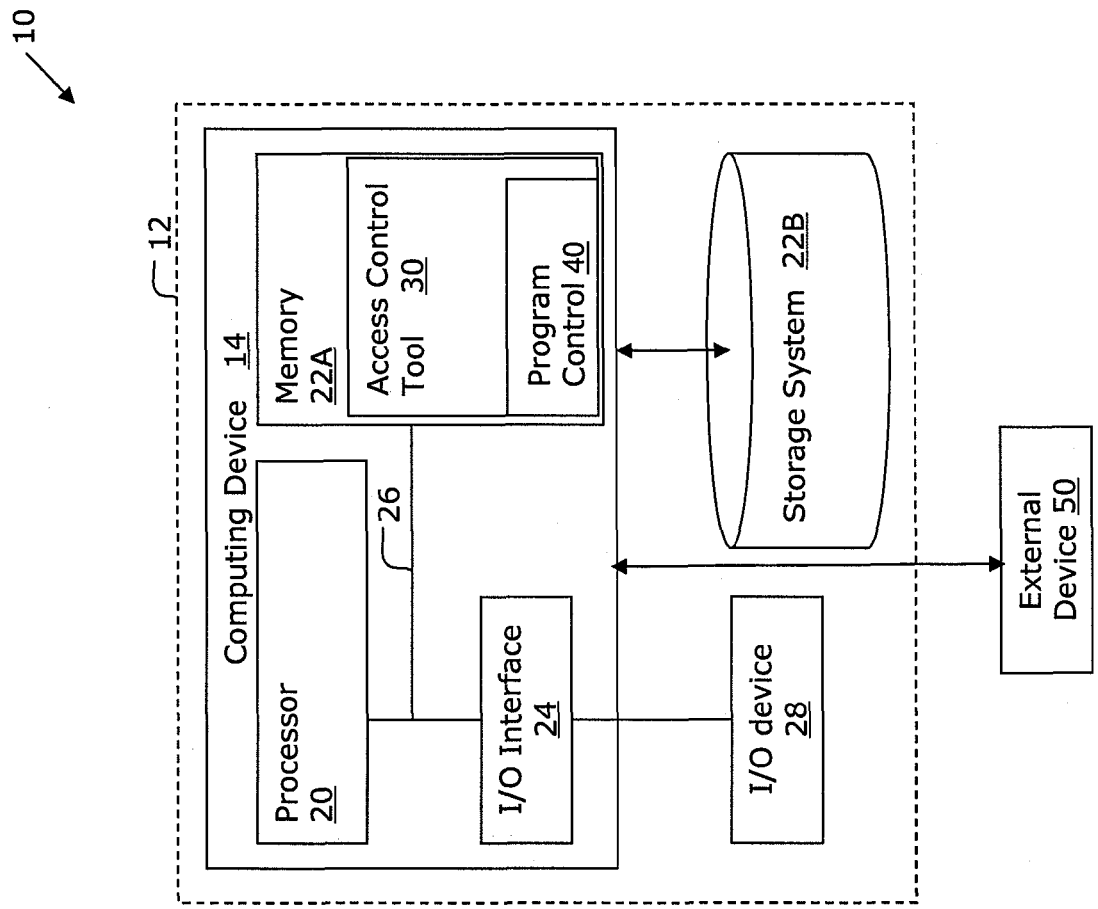
FIG. 1 shows an exemplary environment implementing the invention.

FIG. 1 shows an illustrative environment 10 for managing the processes in accordance with the invention. As shown in FIG. 1, the environment 10 includes a computer infrastructure 12 having a computing device (collaboration tool) 14 that comprises an access control tool 30, which makes computing device 14 operable to restrict or allow access to a collaboration in accordance with the invention, e.g., process described herein. The collaboration may be held between endpoint collaboration devices such as a personal computer, PDA or cellular telephone, represented generally at reference numeral 50. Those of skill in the art will understand that the above endpoint collaboration devices are only illustrative of the many different types of endpoint collaboration devices and implemented with the present invention. For example, additional illustrative examples of collaboration and associated endpoint collaboration devices and methods of collaboration include (i) a teleconference and a telephone, (ii) an instant message chat and a text rendering and input device, e.g., PC, tablet or PDA, (iii) video conferencing, (iv) electronic whiteboards, (v) podcast, (vi) virtual worlds, etc., all of which are contemplated by the invention.

In embodiments, the access control tool 30 may make a comparison of the physical location of the endpoint collaboration device, a type of device to be restricted or a person to be restricted from a collaboration, with preset data held in storage 22B. Likewise, the access control tool 30 may make a comparison of a type of device or a person with authorization to participate in the collaboration. This comparison, as discussed below, can be established and then continuously maintained (compared) to ensure, for example, a device or person does not leave an authorized physical location, or that a previously authorized device remains authorized and/or in an authorized physical location.

Device location attributes can be determined based on GPS or monitoring of communication links between transmission towers, for example. Thus, using known technology, a device has the ability to determine its location based on, for example, GPS;

Ability of a communication system to have device location information; and/or

Ability of a communication system to identify the service provider.

The present invention contemplates that the device location attributes can be physical, such as within the United States, or not within a certain physical location, such as a certain building. Additionally, the device location attributes can be logical, such as not allowing participation in the collaboration if the Service Provider (SP) is not on an approved list, where the motivation for logical control could be based on many different factors. For example, some illustrative factors may be: (i) security (e.g., the SP is believed to eavesdrop on conversations), (ii) financial (e.g., the originating organization does not have a volume discount arrangement with the SP and collaborators are required to use only specific service providers (SP) or (iii) performance/quality (e.g., when using voice over IP technology, only certain SPs have provisioned an acceptable or reliable quality of service attributes within the SP). As an example, in the latter scenario (iii), if a participant used SP#1, the collaboration would likely fail due to poor quality VoIP transmission, so if a VoIP conference call is specified, SP#2 must be used so that the participant can be authorized as a collaboration participant.

Referring still to FIG. 1, the computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution.

Further, the computing device 14 is in communication with an external I/O device/resource 28 and a storage system 22B. The I/O device 28 can comprise any device that enables an individual to interact with the computing device 14 or any device that enables the computing device 14 to communicate with one or more other computing devices using any type of communications link. For example, the external I/O device/resource 28 may be keyboards, displays, pointing devices, etc.

In general, the processor 20 executes program control 40, which is stored in memory 22A and/or storage system 22B. While executing the program control 40, the processor 20 can read and/or write data to/from memory 22A, storage system 22B, and/or I/O interface 24. The bus 26 provides a communications link between each of the components in the computing device 14.

The computing device 14 can be an initiation device (to the collaboration) or a service provider. The computing device 14 can also comprise any general purpose computing article of manufacture capable of executing computer program code (program control) installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 such as the endpoint collaboration devices 50, using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Exemplary Implementation of the System of the Invention

Figure 2:
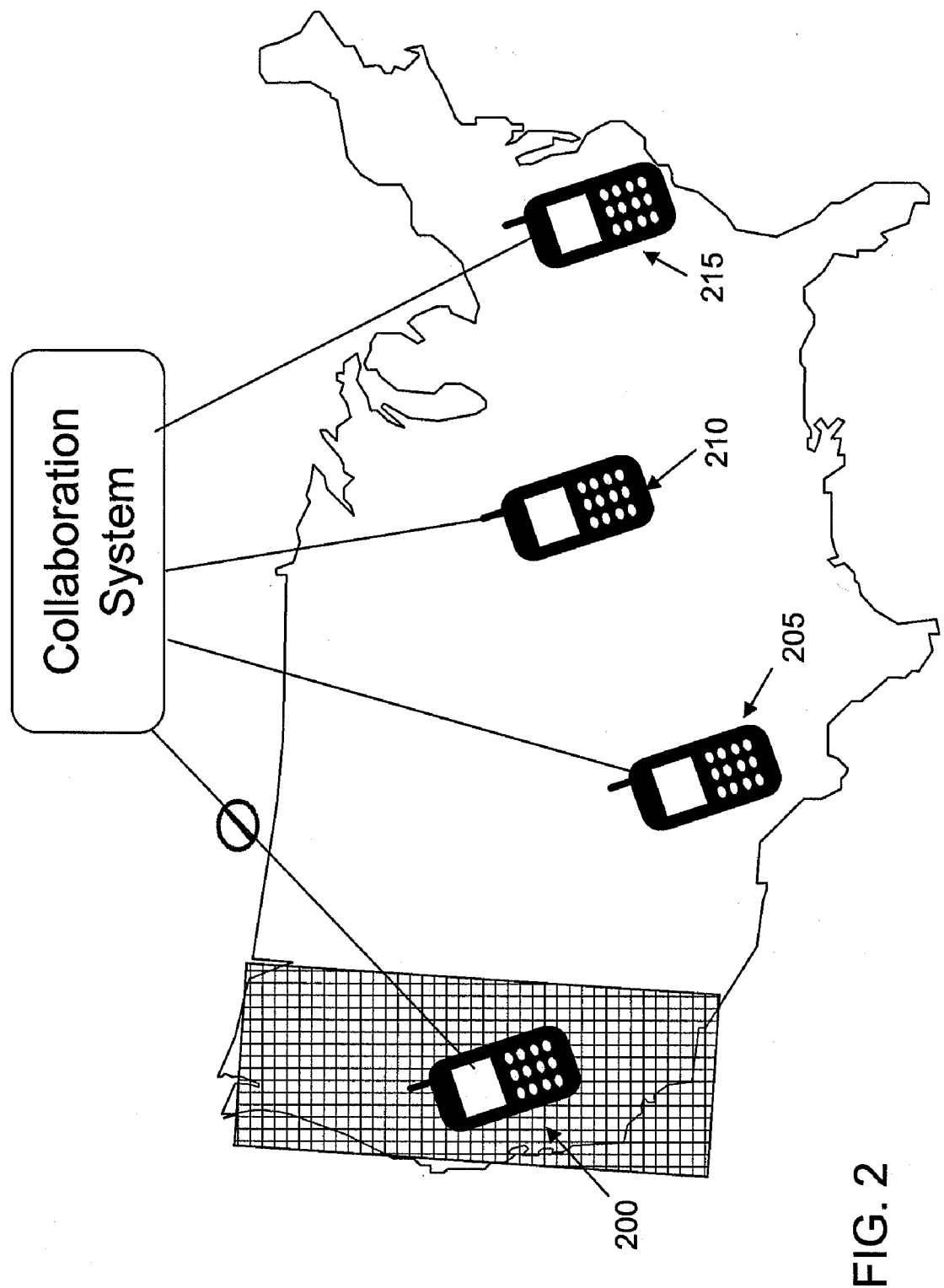
FIG. 2 shows a representative collaboration environment in accordance with the invention.

FIG. 2 shows a representative collaboration environment in accordance with the invention. As shown representatively in FIG. 2, portable device (e.g., cellular telephone) 200 is restricted from collaborating with devices 205, 210 and 215. In this example, device 200 is prohibited based on its physical location. On the other hand, the remaining devices 205, 210 and 215 are authorized to be participants in the collaboration based on their particular physical location. Again, it is noted that the endpoints to the collaboration may be a variety of devices, such as a cellular telephone, a PDA, or a personal computer typically connected via a wireless method.

Figure 3:
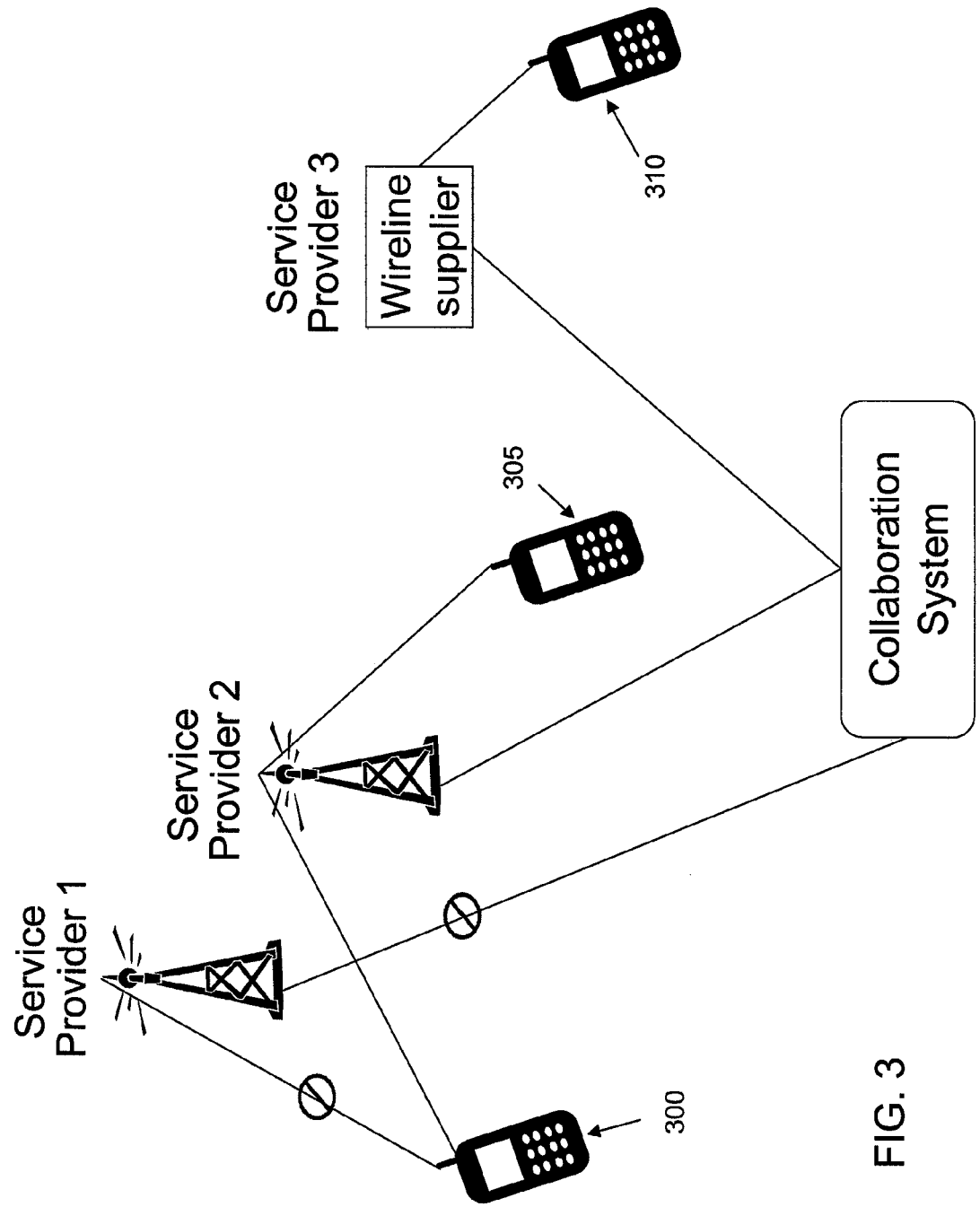
FIG. 3 shows a representative collaboration environment in accordance with the invention.

FIG. 3 shows a representative collaboration environment in accordance with the invention. In embodiments, for some organizations, specific service providers are not the desired transport provider. This may be based on cost, competition, quality of service, etc., and thus their use in a collaboration is prevented by the collaboration tool. As such, in this illustrative scenario, the collaboration tool monitors the transmission types, e.g., service providers 1, 2 and 3, to determine whether a device is transmitting through any of the preferred or authorized service providers. Also, in embodiments, a device will be prohibited from being a collaboration participant if it is transmitting serially through any prohibited service provider 1.

By way of example, in FIG. 3, service provider 1 is shown to be an excluded service provider; whereas, service providers 2 and 3 are shown to be preferred service providers. As such, device 300, if transmitting through service provider 1, would be a prohibited collaboration participant, as detected by the collaboration tool. Also, in this example, device 300 will be prohibited from being a collaboration participant as long as it continues transmitting through service provider 1. On the other hand, device 300 can participate in the collaboration if it begins transmitting through a preferred service provider, e.g., service provider 2. Devices 305 and 310 remain collaboration participants as they are transmitting through the preferred service providers 2 and 3, as detected by the collaboration tool.

In implementation, the administrator or owner of the collaboration tool defines attributes (rules) that allow the endpoint collaboration devices and/or users the necessary authorization to be collaboration participants or, alternatively, to restrict the endpoint collaboration devices and/or users from being collaboration participants. For example, the administrator or the owner may define numerous different attributes such as, for example, device identification, user identification, location of the device, etc. These attributes can be populated in a table, which is saved in and accessed from storage 22B, for example. An exemplary illustration of such parameters is shown in TABLE 1, below.

TABLE 1

| Collaboration Device/User identity | Eligible Location Attribute | Ineligible Location Attribute | Notification Attributes (who: Message) |
|---|---|---|---|
| John | United States | -na- | End User: "You are outside the US and not eligible to participate in this collaboration". Administrator: "John is outside of allowable area (United States) and has been denied access to collaboration. |
| Device ID #123456789 | United States | AC 919 | End User: "You are outside the US or within the 919 area code and not eligible to participate in this collaboration" Administrator: "Device #123456789 is outside of allowable area and has been denied access to collaboration. |
| Dave | -na- | Fly-by-night SP | End User: "You are using the fly-by-night SP and not eligible to participate in this collaboration" Administrator: "Dave is using an incorrect SP and has been denied access to collaboration. |

Referring to TABLE 1, the administrator can define the collaboration device and/or user by, for example, device identification, user name, password, etc. Location attributes can be defined as eligible or ineligible locations. The locations can be defined in numerous ways such as, for example, zip code, area code, country, state, SP provider, type of connection, etc. It is also contemplated that the description of the location can be based on GPS coordinates and/or political boundary, such as city, state, country. As such, it is observed that the location can be specified as direct location, e.g., a GPS location, or derived location, e.g., a zip code area, phone area code, which is then matched to a direct location.

The specific technique which describes a location can be based on the attributes of the collaborating device. For example, a telephone conversation may be based on the area code of the collaborator; whereas, an instant message system may be based on the GPS location of the device or the identity of the service provider. Moreover, the location can be specified as "the collaborator must be in the area" or "the collaborator must not be in this area". Also, location fields (and any other fields) can be populated with "-na-" (as one of many different examples), which designates that the field should not be considered when determining authorization or restriction to collaboration participation.

The table can also be populated with notification attributes. The notification attributes can include messages to the end user and/or administrator. The messages may include, for example, notification of participation ineligibility and remedies to become eligible for collaboration participation. The message to the administrator may include, for example, the identification of ineligible participants and the reason for such ineligibility. The notification (alerts) can also alert the user and/or endpoint collaboration device if the user and/or endpoint collaboration device is no longer within an eligible location.

Those of skill in the art will realize that the above examples are not exhaustive and, as such, other attributes are contemplated by the invention. For example, additional or alternative attributes may include the type of device used by a collaboration participant, the subject matter of the collaboration session, level of security required to be a participant, etc., any of which may be provided in the table to permit or restrict collaboration participation.

Exemplary Processes in Accordance with the Invention

FIGS. 4-8 are flow diagrams showing processing steps of embodiments of the invention. FIGS. 4-8 may equally represent a high-level block diagram of components of the invention implementing the steps thereof. The steps of FIGS. 4-8 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

The invention can take the form of an entirely hardware embodiment or an embodiment containing both hardware and software elements (any of which is referred generally as "file management program"). The hardware and software elements include a computer infrastructure configured to implement the functionality of the present invention. The computer infrastructure may take the form, for example, shown in FIG. 1. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, a service provider, such as a Solution Integrator, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement.

Preparation Phase

Figure 4:
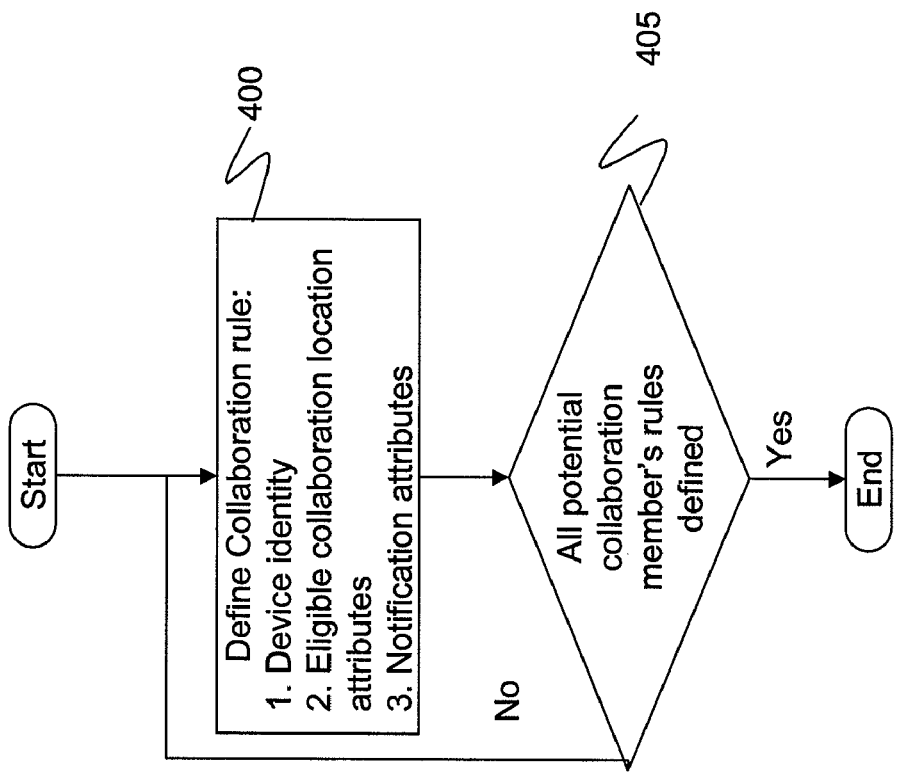
FIGS. 4-8 are flow diagrams showing processing steps of embodiments of the invention.

FIG. 4 shows a process of an administrator or owner of the collaboration tool defining attributes required for collaboration participation. Specifically, at step 400, a collaboration administrator will define rules used to authorize or prohibit collaboration participation. For example, the rules (attributes) may include, for example, device identity, eligibility locations or other eligibility attributes. For those skilled in the art, it is apparent that "location" can also represent non-physical location attributes, such SP identity, link attributes, such as capacity, type, and location. At step 405, a determination is made as to whether all of the rules are defined. If so, the process ends. If not, the process returns to step 400.

Operational Phases

Figure 5:
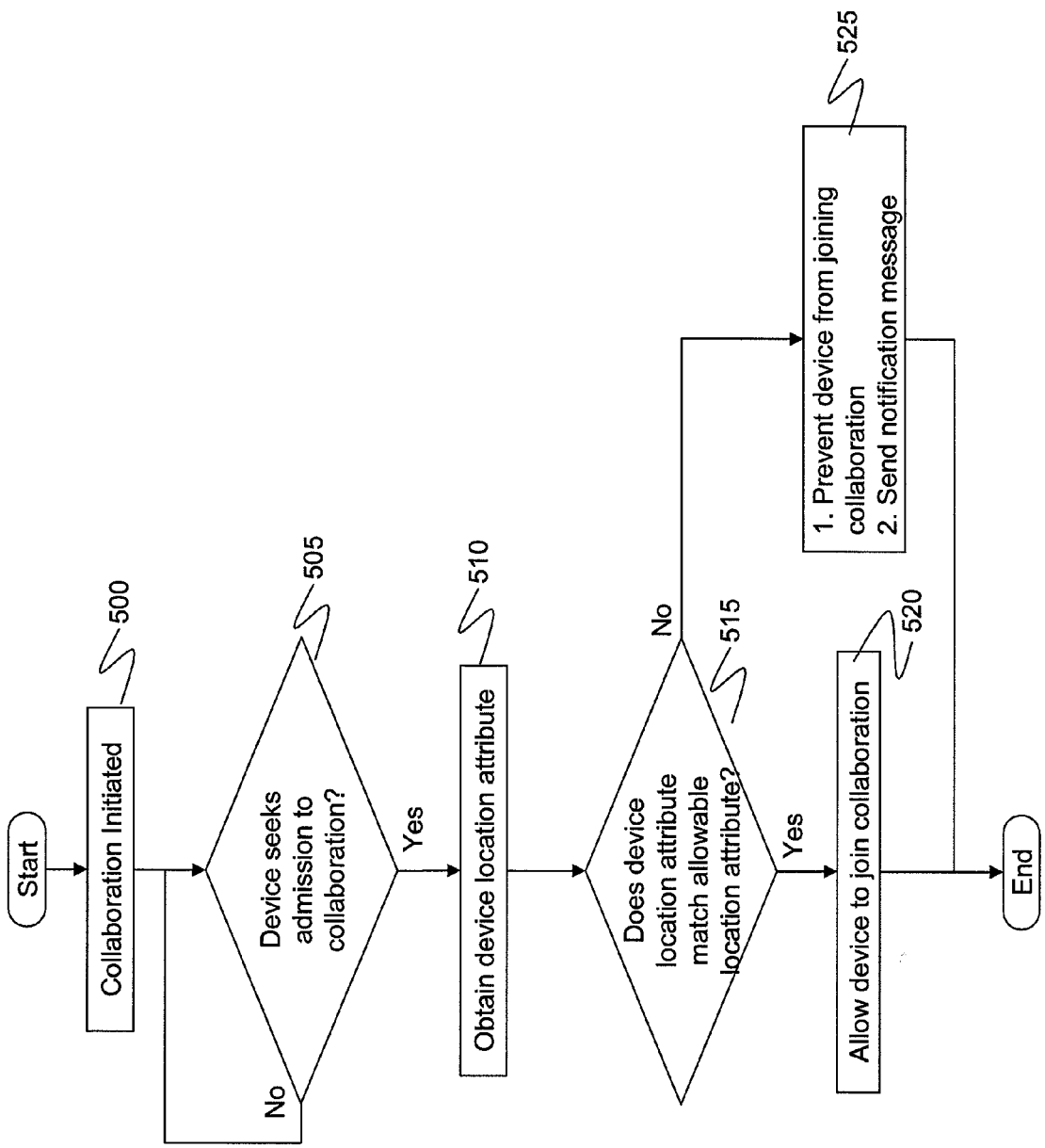

FIG. 5 shows the actions of the collaboration tool when an endpoint collaboration device attempts to join the collaboration. Specifically, at step 500, the endpoint collaboration device initiates collaboration. At step 505, a determination is made as to whether the endpoint collaborating device seeks admission as a collaboration participant. If not, the process loops back to step 505. If the endpoint collaboration device seeks admission, at step 510, the program control obtains the device location attribute. At step 515, the program control determines whether the location of the endpoint collaboration device matches the device location attribute. If so, the endpoint collaboration device is authorized to be a collaboration participant. If there is no match, the program control will prevent the endpoint collaboration device from joining the collaboration at step 525. At step 525, the program control can also send a notification to the endpoint collaboration device and/or administrator regarding the restriction to the collaboration and, in embodiments, remedial steps to undertake in order to be authorized to be a collaboration participant. The process then ends.

Figure 6:
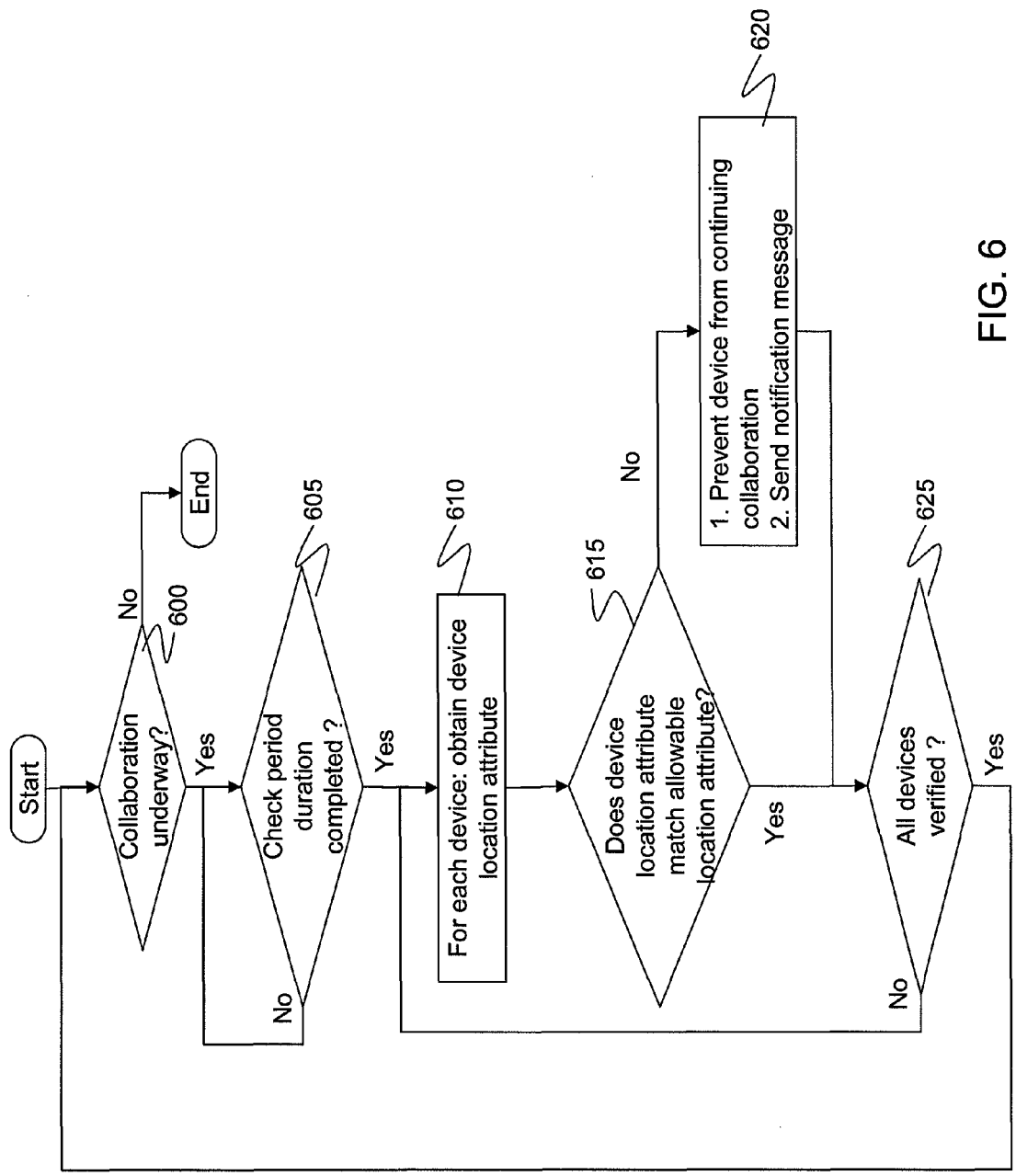
Figure 7:
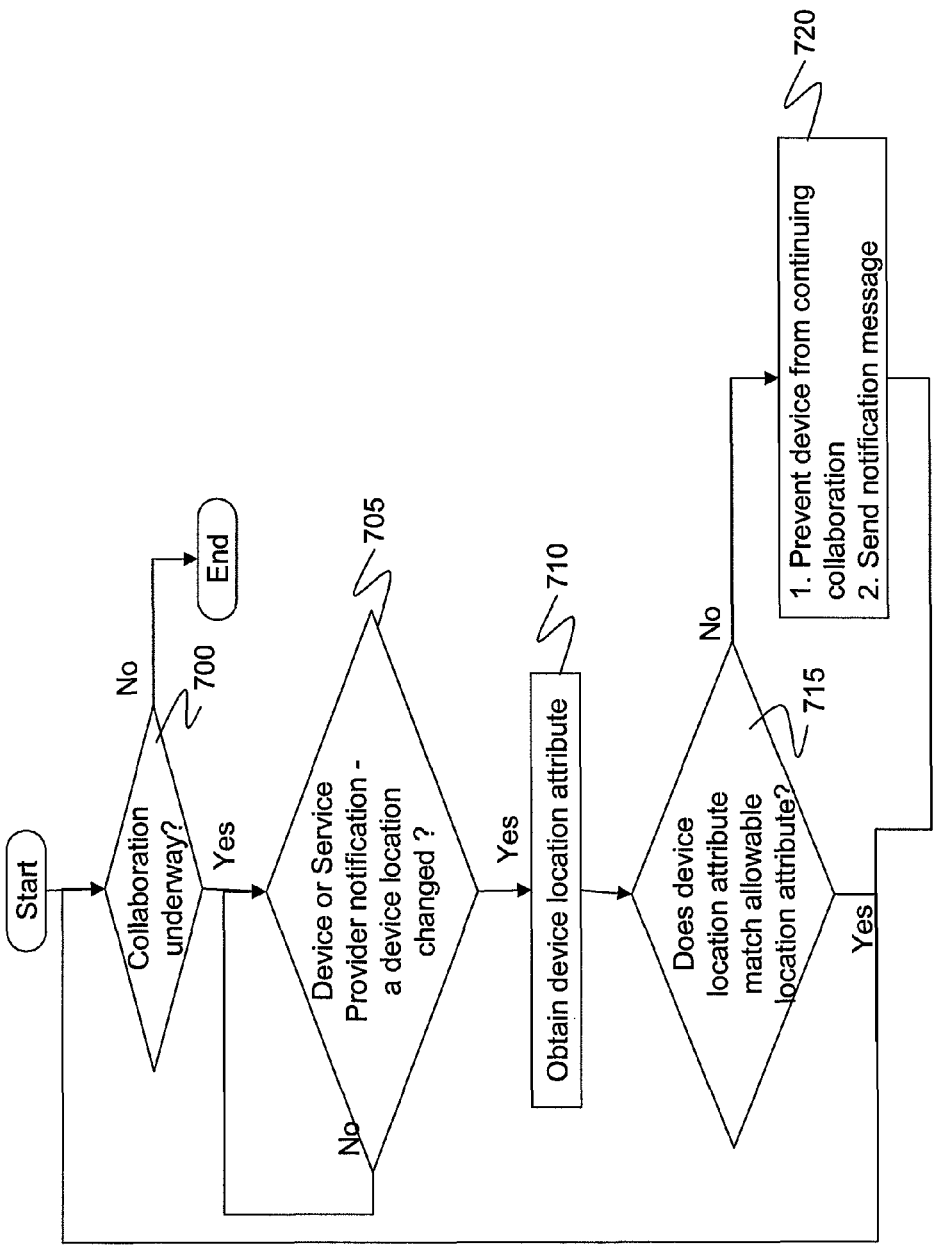
Figure 8:
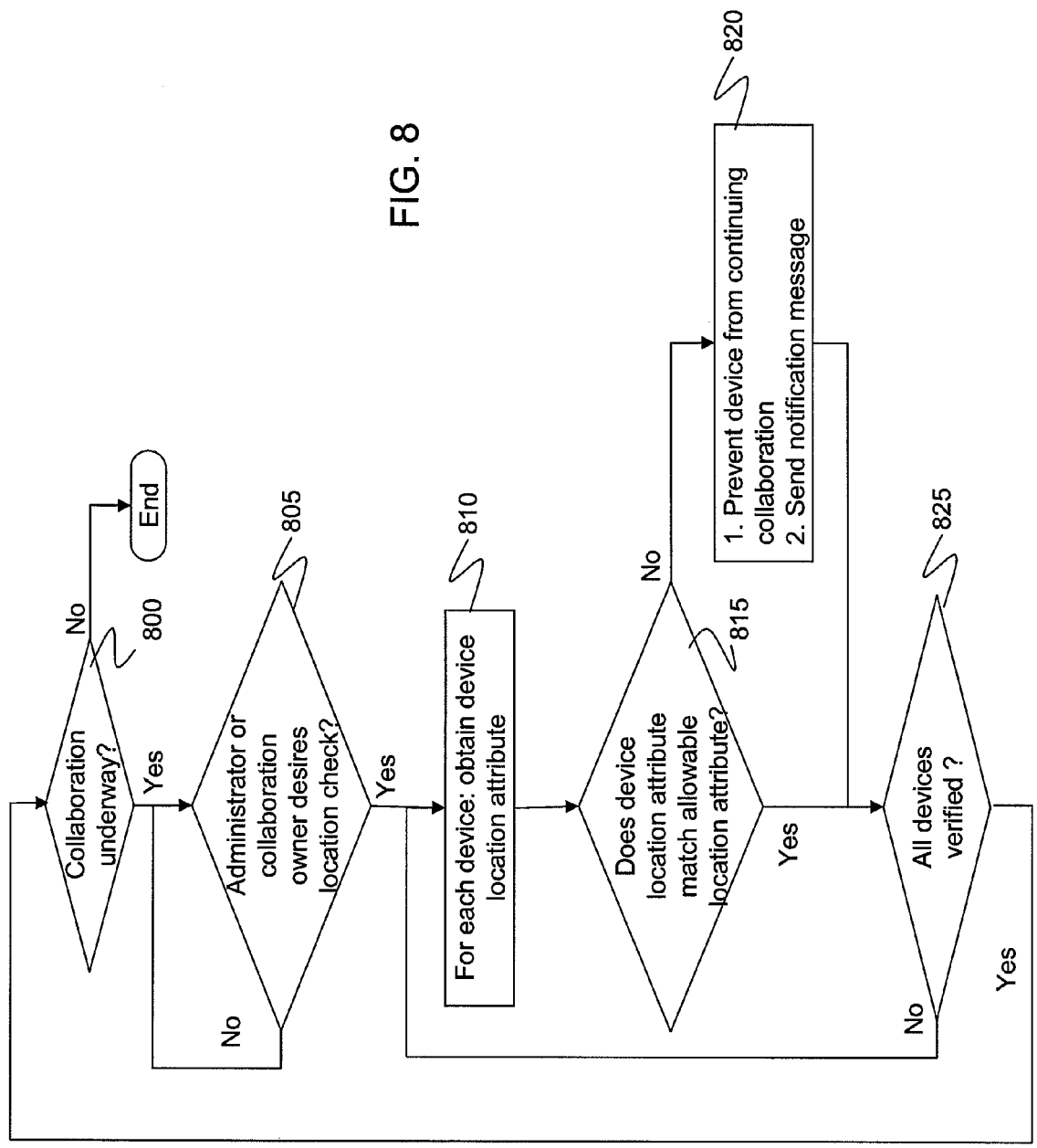

FIGS. 6-8 show the actions of the collaboration tool after a collaboration participation has already been established by the collaboration tool. More specifically, FIGS. 6-8 show different processes to determine whether an endpoint collaboration device and/or user remain eligible as a collaboration participant, after a collaboration has been established and is underway. This determination may be based on many different factors such as, for example, location of the endpoint collaboration device, identity of the user or endpoint collaboration device, connection to certain service providers, security clearances, use of certain technologies, amongst other considerations. In specific illustrations, for example, the action of eligibility determination may be based on whether (i) a predetermined period of time has lapsed (FIG. 6); (ii) there has been a change in the service provider or endpoint collaboration device (FIG. 7); and/or (iii) there has been a change in location of the endpoint collaboration device and/or user (FIG. 8).

In particular, referring to FIG. 6, at step 600, the program control determines whether the collaboration is underway. If not, the process ends; however, if the collaboration is underway, at step 605, the program control determines whether a predetermined time has elapsed. If a predetermined period has not elapsed, the process loops back to step 605. If a predetermined amount of time has lapsed, e.g., one minute or other time period, the process continues to step 610, which begins the action of determining the continued collaboration eligibility of the collaborating devices.

At step 610, the program control obtains the device location attribute for each endpoint collaboration device. At step 615, the program control determines whether the location of the endpoint collaboration device matches the device location attribute. If there is no match, the program control will prevent the endpoint collaboration device from continuing as a participant in the collaboration at step 620. Also, the program control will send a notification message to the endpoint collaboration device and/or administrator regarding the restriction to the collaboration and, in embodiments, remedial steps to undertake in order to be authorized to rejoin as a collaboration participant. The process continues to step 625.

If there is a match at step 615, the process continues to step 625. At step 625, the program control will make a determination as to whether the endpoint collaboration devices are verified. If the endpoint collaboration devices are verified, the process continues to step 600. If the endpoint collaboration devices are not verified, the process continues to step 610.

FIG. 7 shows the actions of the collaboration tool when an endpoint collaboration device is removed from the collaboration. Specifically, at step 700, the program control determines whether the collaboration is underway. If not, the process ends; however, if the collaboration is underway, at step 705, the program control determines whether there has been a change in the service provider or endpoint collaboration device. If there is no change, the process loops back to step 705. If there is a change in the service provider and/or the endpoint collaboration device, the process continues to step 710.

At step 710, the program control obtains the device location attribute for each affected endpoint collaboration device. At step 715, the program control determines whether the location of the endpoint collaboration device matches the device location attribute. If there is no match, the program control will prevent the endpoint collaboration device from continued participation in the collaboration at step 720. Also, the program control will send a notification message to the endpoint collaboration device and/or administrator regarding the restriction to the collaboration and, in embodiments, remedial steps to undertake in order to be authorized to rejoin as a collaboration participant. The process continues to step 700.

FIG. 8 shows the actions of the collaboration tool when an endpoint collaboration device is removed from the collaboration. Specifically, at step 800, the program control determines whether the collaboration is underway. If not, the process ends; however, if the collaboration is underway, at step 805, the program control determines whether the administrator or the endpoint collaboration device wants a location check. If not, the process continues at step 805; however, if a location check is required or wanted, the process continues to step 810.

At step 810, the program control obtains the device location attribute for each endpoint collaboration device. At step 815, the program control determines whether the location of the endpoint collaboration device matches the device location attribute. If there is no match, the program control will prevent the endpoint collaboration device from continuing as a participant in the collaboration at step 820. Also, the program control will send a notification message to the endpoint collaboration device and/or administrator regarding the restriction to the collaboration and, in embodiments, remedial steps to undertake in order to be authorized to rejoin as a collaboration participant. The process continues to step 825.

If there is a match at step 815, the process continues to step 825. At step 825, the program control will make a determination as to whether the endpoint collaboration devices are verified. If the endpoint collaboration devices are verified, the process continues to step 800. If the endpoint collaboration devices are not verified, the process continues to step 810.

While the invention has been described in terms of embodiments, those skilled in the art will recognize that the invention can be practiced with modifications and in the spirit and scope of the appended claims.

What is claimed is:

1. A computer system for controlling communication between endpoint collaboration devices, the computer system comprising:
   a central processing unit, a computer readable memory, and a computer-readable tangible storage device;
   first program instructions to determine one or more service providers through which the endpoint collaboration devices can potentially communicate to enable a collaboration between the endpoint collaboration devices;
   second program instructions to authorize the collaboration between the endpoint collaboration devices via the one or more service providers if a comparison between the one or more service providers through which the communications can potentially occur for the endpoint collaboration devices and a predetermined list of service providers through which the collaboration between the endpoint collaboration devices is prohibited indicates that the collaboration is allowed through the one or more service providers between the endpoint collaboration devices;
   third program instructions to subsequently identify service providers that currently provide collaborative communication between the endpoint collaboration devices; and
   fourth program instructions to discontinue the current collaborative communication between the endpoint collaboration devices if a comparison between the service providers through which the current collaborative communication occurs for the endpoint collaboration devices and a list indicates that the current collaborative communication by the endpoint collaboration devices occurs through a prohibited service provider in the list,
   wherein the first program instructions, the second program instructions, the third program instructions, and the fourth program instructions are stored in the computer-readable tangible storage device for execution by the central processing unit via the computer-readable memory.

2. The computer system of claim 1, wherein the second program instructions authorize the collaboration between the endpoint collaboration devices if stored attributes of at least one of a physical location of the endpoint collaboration devices, a logical location of the endpoint collaboration devices, an identification of the endpoint collaboration devices, a link capacity, a link type, a link location, and an identification of a particular device match corresponding attributes for the endpoint collaboration devices.

3. The computer system of claim 2, wherein the physical location is one of an area code, a zip code, and a physical location, and the logical location is a connection to a pre-approved service provider.

4. The computer system of claim 3, wherein the connection to the pre-approved service provider is based on at least one of security, quality of connection, contractual obligations associated with an initiating device in the endpoint collaboration devices, and costs.

5. The computer system of claim 1, wherein the endpoint collaboration devices are at least one of a mobile device connected via a wireless transmission and a stationary device connected via a wired connection.

6. The computer system of claim 1, wherein the endpoint collaboration devices collaborate via at least one of (i) a teleconference, (ii) an instant message chat, (iii) video conferencing, (iv) electronic whiteboards, (v) a podcast, and (vi) virtual worlds.

7. The computer system of claim 1, wherein the first program instructions are configured to continuously monitor the endpoint collaboration devices to determine whether one or more of the endpoint collaboration devices transmit information through the prohibited service provider.

8. The computer system of claim 7, wherein the second program instructions are configured to restrict the one or more of the endpoint collaboration devices from the collaboration if there has been a change to an unauthorized (i) service provider, (ii) endpoint collaboration device, or (iii) location of the one or more of the endpoint collaboration devices.

9. The computer system of claim 1, wherein the fourth program instructions provide a message to a restricted endpoint collaboration device in response to the restricted endpoint collaboration device not being authorized.

10. The computer system of claim 9, wherein the message includes remedial action for the restricted endpoint collaboration device to become authorized.

11. The computer system of claim 2, wherein the stored attributes include eligible or ineligible attributes, either of which is configured to provide authorization to become a collaboration participant if a match is found with the corresponding attributes.

12. The computer system of claim 1, wherein a computer infrastructure is configured to determine an endpoint collaboration device location based on a signal received from an endpoint collaboration device via GPS, monitoring of communication links, and service provider information.

13. A computer program product for controlling collaboration participation, the computer program product comprising:
   a computer-readable tangible storage device;
   first program instructions to determine one or more service providers through which endpoint collaboration devices can potentially communicate to enable a collaboration between the endpoint collaboration devices;
   second program instructions to authorize the collaboration between the endpoint collaboration devices via the one or more service providers if a comparison between the one or more service providers through which communications can potentially occur for the endpoint collaboration devices and a predetermined list of prohibited service providers through which the collaboration between the endpoint collaboration devices is prohibited indicates that the collaboration is allowed through the one or more service providers between the endpoint collaboration devices;
   third program instructions to subsequently identify service providers that currently provide collaborative communication between the endpoint collaboration devices; and
   fourth program instructions to discontinue current collaborative communication between the endpoint collaboration devices if a comparison between the service providers through which the current collaborative communication occurs for the endpoint collaboration devices and the predetermined list indicates that the current collaborative communication between the endpoint collaboration devices occur through a prohibited service provider in the predetermined list, wherein the first, the second, the third, and the fourth program instructions are stored on the computer-readable tangible storage device.

14. The computer program product of claim 13, wherein the second program instructions authorize collaboration between the endpoint collaboration devices if stored attributes of at least one of a physical location of the endpoint collaboration devices, a logical location of the endpoint collaboration devices, an identification of the endpoint collaboration devices, a link capacity, a link type, a link location, and an identification of a particular device match corresponding attributes for the endpoint collaboration devices.

15. The computer program product of claim 13, wherein the first program instructions are configured to continuously monitor the endpoint collaboration devices to determine whether at least one of the endpoint collaboration devices transmit information through the prohibited service provider.

16. The computer program product of claim 13, wherein the second program instructions are configured to restrict at least one of the endpoint collaboration devices from the collaboration if there has been a change to an unauthorized (i) service provider, (ii) endpoint collaboration device, or (iii) location of one or more of the endpoint collaboration devices.

17. The computer program product of claim 13 further comprising fifth program instructions to provide a message to a restricted endpoint collaboration device.

18. A method for controlling collaboration participation comprising:
   a computer monitoring endpoint collaboration devices and identifying transmissions through service providers;
   the computer authorizing a collaboration between the endpoint collaboration devices if a comparison between the service providers for the endpoint collaboration devices and a predetermined list of service providers through which the collaboration between the endpoint collaboration devices is prohibited indicates that the collaboration is allowed between the endpoint collaboration devices; and
   the computer discontinuing the collaboration between the endpoint collaboration devices if a subsequent comparison between the service providers through which the transmissions occur for the endpoint collaboration devices and the predetermined list indicates that the transmissions by the endpoint collaboration devices have occurred through a prohibited service provider.

19. The method of claim 18, wherein:
   a determined physical location is a GPS location, an area code, or a zip code of the endpoint collaboration devices;
   the computer preventing continuing the collaboration between the endpoint collaboration devices if the determined physical location of the endpoint collaboration devices is located in an ineligible physical location in eligible and/or ineligible physical locations stored in stored attributes and information; and
   after the step of preventing the collaboration between the endpoint collaboration devices, the computer sending a notification to the endpoint collaboration devices explaining steps to undertake to be authorized as a collaboration participant.

20. The method of claim 19, wherein:
   a match is found between the stored attributes and the information related to one or more endpoint collaboration devices by comparing the determined physical location of the one or more endpoint collaboration devices to the eligible and/or ineligible physical locations; and the determined physical location is the GPS location, the area code, or the zip code of the one or more endpoint collaboration devices.

21. The computer system of claim 1, wherein the collaboration is allowed between two or more of the endpoint collaboration devices responsive to transmitting by the two or more of the endpoint collaboration devices through an authorized service provider.

22. The computer system of claim 3, wherein the stored attributes are stored in a table and includes an indication of whether a location field should be used in the comparison to determine whether the collaboration is allowed between the endpoint collaboration devices.

23. A computer system for controlling communication between users of endpoint collaboration devices, the computer system comprising:
- a central processing unit, a computer readable memory, and a computer-readable tangible storage device;
- first program instructions to determine one or more service providers through which the users of the endpoint collaboration devices can potentially communicate to enable a collaboration between the users;
- second program instructions to authorize the collaboration between the users via the one or more service providers if a comparison between the one or more service providers through which communications can potentially occur for the users and a predetermined list of prohibited service providers through which the collaboration between the users is prohibited indicates that the collaboration is allowed through the one or more service providers between the users;
- third program instructions to subsequently identify service providers that currently provide collaborative communication between the users; and
- fourth program instructions to discontinue the current collaborative communication between the users if the comparison between the service providers through which the current collaborative communication occurs for the users and the predetermined list indicates that the current collaborative communication by the users occurs through a prohibited service provider in the predetermined list,
- wherein the first program instructions, the second program instructions, the third program instructions, and the fourth program instructions are stored in the computer-readable tangible storage device for execution by the central processing unit via the computer readable memory.

24. A computer program product for controlling communication between endpoint collaboration devices, the computer program product comprising:
- a computer-readable tangible storage device;
- first program instructions to determine one or more service providers through which users can potentially communicate to enable a collaboration between the users;
- second program instructions to authorize the collaboration between the users via the one or more service providers if a comparison between the one or service providers through which communications can potentially occur for the users and a predetermined list of prohibited service providers through which the collaboration between the users is prohibited indicates that the collaboration is allowed through the one or more service providers between the users;
- third program instructions to subsequently identify service providers that currently provide collaborative communication between the users; and
- fourth program instructions to discontinue the current collaborative communication between the users if a subsequent comparison between the one or more service providers through which transmissions occur for the endpoint collaboration devices and the predetermined list indicates that current collaborative communication by the users through a prohibited service provider in the predetermined list, wherein the first, the second, the third, and the fourth program instructions are stored on the computer-readable tangible storage device.

* * * * *